(12) United States Patent
Davis, Jr. et al.

(10) Patent No.: US 9,884,529 B2
(45) Date of Patent: Feb. 6, 2018

(54) TRAILER LOCK SYSTEM

(71) Applicant: Turn & Burn Welding, Inc., Claremore, OK (US)

(72) Inventors: Fred A. Davis, Jr., Inola, OK (US); Tami A. Davis, Inola, OK (US)

(73) Assignee: Turn & Burn Welding, Inc., Claremore, OK (US)

( * ) Notice: Subject to any disclaimer, the term of this patent is extended or adjusted under 35 U.S.C. 154(b) by 0 days.

(21) Appl. No.: 15/070,925

(22) Filed: Mar. 15, 2016

(65) Prior Publication Data

US 2017/0267041 A1  Sep. 21, 2017

(51) Int. Cl.
*B60D 1/28* (2006.01)
*B60D 1/60* (2006.01)
*B60D 1/06* (2006.01)

(52) U.S. Cl.
CPC .............. *B60D 1/28* (2013.01); *B60D 1/06* (2013.01); *B60D 1/60* (2013.01)

(58) Field of Classification Search
CPC ................................. B60D 1/60; B60D 1/605
See application file for complete search history.

(56) References Cited

U.S. PATENT DOCUMENTS

| | | | | |
|---|---|---|---|---|
| 3,605,457 A * | 9/1971 | Foster | ...................... | B60D 1/60 280/507 |
| 4,141,569 A * | 2/1979 | Dilk | ........................ | B60D 1/60 280/507 |
| 5,421,601 A * | 6/1995 | Hinze | ...................... | B60D 1/60 280/507 |
| 5,794,961 A | 8/1998 | Niswanger | | |
| 6,070,441 A | 6/2000 | Bernstrom | | |
| 6,244,614 B1 * | 6/2001 | Bonvillain | ............... | B60D 1/60 280/507 |
| 6,412,313 B1 * | 7/2002 | Bernstrom | ............... | B60D 1/60 280/507 |
| 6,606,887 B1 | 8/2003 | Zimmer et al. | | |
| 6,644,071 B2 | 11/2003 | Gilbertson et al. | | |
| 6,698,256 B2 * | 3/2004 | Witchey | ................... | B60D 1/02 280/507 |
| 6,862,904 B1 * | 3/2005 | Hubbart | ................... | B60D 1/60 280/507 |
| 6,962,361 B1 * | 11/2005 | Price | ........................ | B60D 1/60 280/507 |
| 6,976,695 B1 * | 12/2005 | Smith, III | ................ | B60D 1/28 280/507 |
| 7,040,646 B2 * | 5/2006 | Pare | ......................... | B60D 1/06 280/507 |
| 7,246,810 B2 * | 7/2007 | Bussiere | .................. | B60D 1/60 280/507 |
| 7,431,320 B2 * | 10/2008 | Madden, III | ............. | B60D 1/28 280/432 |

(Continued)

Primary Examiner — Kevin Hurley
(74) Attorney, Agent, or Firm — Hall Estill Attorneys at Law

(57) ABSTRACT

A trailer lock system may enclose and secure a bumper or 5$^{th}$ wheel trailer hitch. The trailer lock system can have at least a first housing that is configured to engage a second housing to enclose a portion of a hitch. The second housing can support a first protrusion that extends at least six inches from the second housing to prevent the hitch from connecting to a vehicle.

20 Claims, 5 Drawing Sheets

(56) References Cited

U.S. PATENT DOCUMENTS

| | | | |
|---|---|---|---|
| 7,635,143 B2* | 12/2009 | Pappalardo | B60D 1/065 |
| | | | 280/507 |
| 7,699,336 B2* | 4/2010 | Van Laere | B60D 1/60 |
| | | | 280/507 |
| 8,083,249 B2 | 12/2011 | Most et al. | |
| 8,556,288 B1 | 10/2013 | Bale | |
| 8,757,654 B2* | 6/2014 | Lachance | B60D 1/28 |
| | | | 280/507 |
| 8,783,705 B2 | 7/2014 | Drake et al. | |
| 9,033,358 B1* | 5/2015 | Williamson | B60D 1/60 |
| | | | 280/507 |
| 2012/0200067 A1* | 8/2012 | Bonham | B60D 1/60 |
| | | | 280/507 |
| 2016/0339751 A1* | 11/2016 | Odom | B60D 1/60 |
| 2017/0100973 A1* | 4/2017 | Tsai | B60D 1/06 |

* cited by examiner

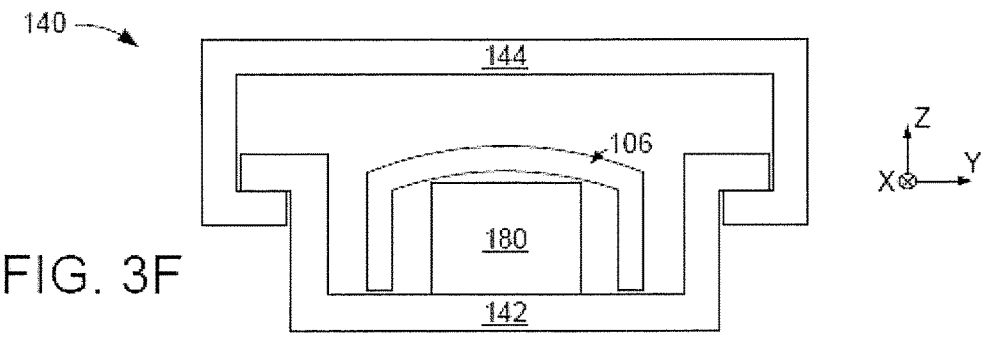
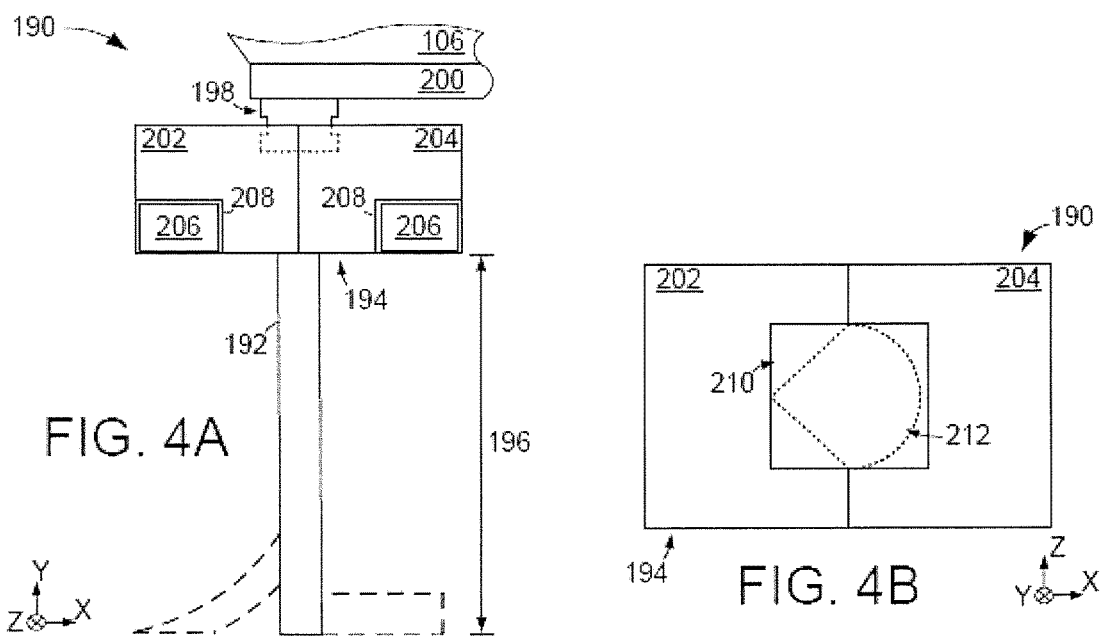
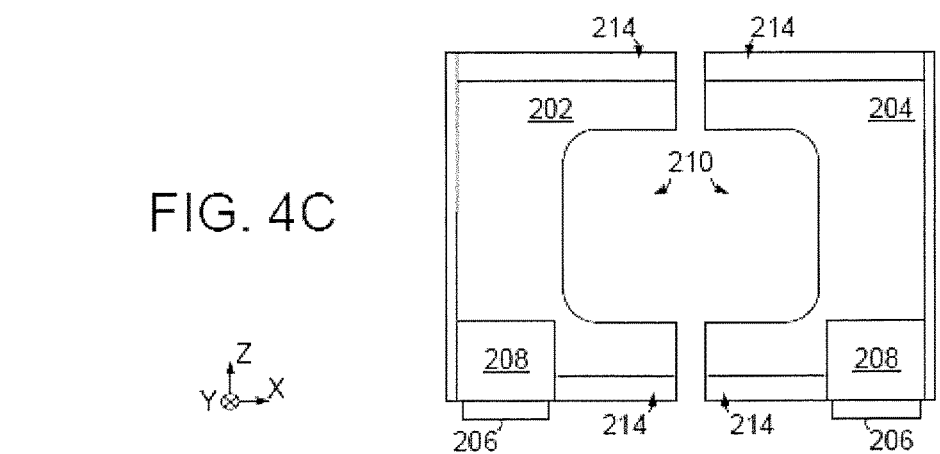

TRAILER LOCK SYSTEM

SUMMARY

A trailer lock system may enclose and secure a bumper or $5^{th}$ wheel trailer hitch. The trailer lock system, in some embodiments, has at least a first housing configured to engage a second housing to enclose a portion of a hitch. The second housing supports a first protrusion that extends at least six inches from the second housing to prevent the hitch from connecting to a vehicle.

BRIEF DESCRIPTION OF THE DRAWINGS

FIGS. 3A-3F respectively display various portions of an example trailer lock system configured in accordance with some embodiments.

FIGS. 4A-4F represent various views of portions of an example trailer lock system constructed and operated in accordance with various embodiments.

DETAILED DESCRIPTION

There has been a proliferation of trailer towing recently that has resulted in more and more trailers being stored in an unused state. The increased exposure of a stored trailer corresponds with greater susceptibility to theft of items from a trailer as well as theft of the trailer itself. While various trailer locks attempt to disable a trailer's hitch coupler and/or a wheel of a trailer. However, no trailer lock to date has been able to securely prevent thieves from transporting a trailer with, or without, removing the trailer lock. Hence, there is a continued consumer and industry goal to provide a trailer lock that disables transportation of a trailer and is robust enough to prevent thieves from removing the lock.

Accordingly, assorted embodiments provide a trailer lock system that has at least first and second housings first housing that engage to enclose and disable a trailer hitch while a protrusion extends from the second housing at least six inches to prevent the hitch from connecting to a vehicle. The ability to securely lock the towing hitch while preventing a vehicle from connecting to the trailer with the lock in place provides multiple levels of protection from would-be thieves.

Figure 1:
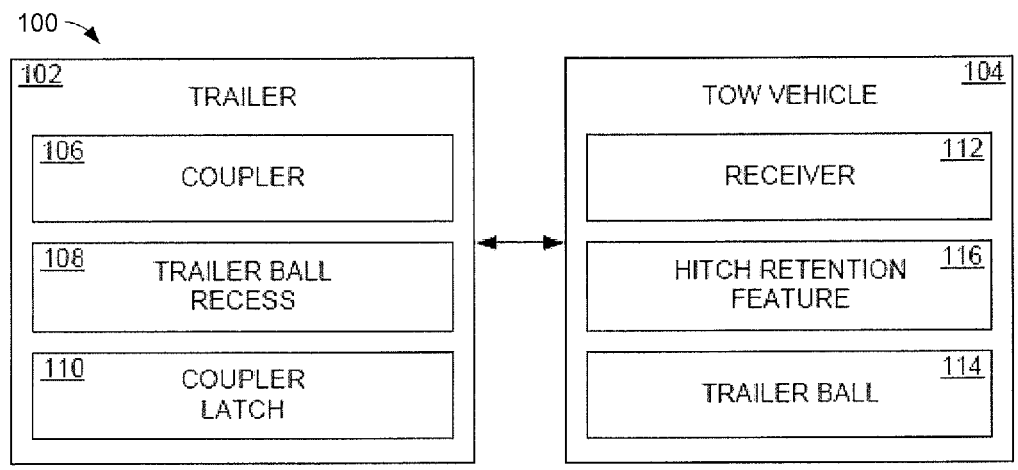
FIG. 1 is a block representation of an example trailer lock system arranged in accordance with various embodiments.

FIG. 1 illustrates a block representation of an example trailer lock system 100 that deters and prevents movement of a trailer 102 by one or more tow vehicle(s) 104. A trailer 102 may be any type, size, shape, and material that couples to a tow vehicle 104 via a coupler 106. For instance, the trailer 102 may be a bumper type with a bumper coupler 106 that provides a trailer ball recess 108 that is secured by a coupler latch 110. As another non-limiting example, the trailer 102 may be a $5^{th}$ wheel type with a king pin coupler 106 that extends from a pin box portion of the trailer 102.

Regardless of the type of trailer 102, the tow vehicle 104 has at least a receiver 112 that physically engages and secures the trailer 102 to the portions of the tow vehicle 104, such as the vehicle's frame or axle. The receiver 112, in a $5^{th}$ wheel type trailer 102, may be characterized as a hitch plate and frame affixed to the tow vehicle 104. In a bumper type trailer 102, the receiver 112 can be characterized as a bracket affixed to the tow vehicle's frame and capable of connecting to a ball mount assembly that comprises at least one trailer ball 114. The tow vehicle 104 may further have one or more hitch retention features 116, such as a chain, rope, or rigid connection, which provides a secondary connection point between the trailer 102 and the receiver 112.

It is noted that the collective towing components of the trailer 102 and tow vehicle 104 are characterized as a "hitch" and the various components can be denoted with a hitch moniker, such as hitch coupler, hitch ball, and hitch receiver.

Figure 2A:
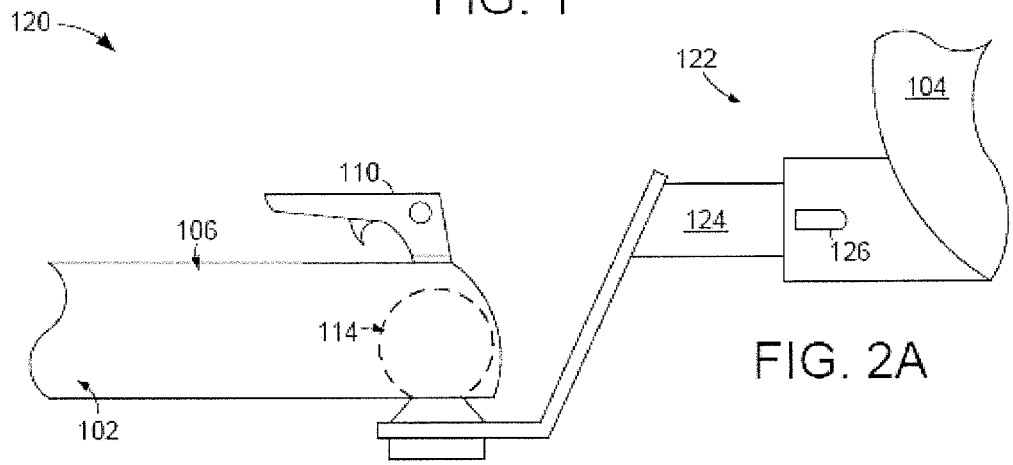
FIGS. 2A and 2B respectively show line representations of portions of an example trailer hitch capable of being used with the trailer lock system of FIG. 1.
Figure 2B:
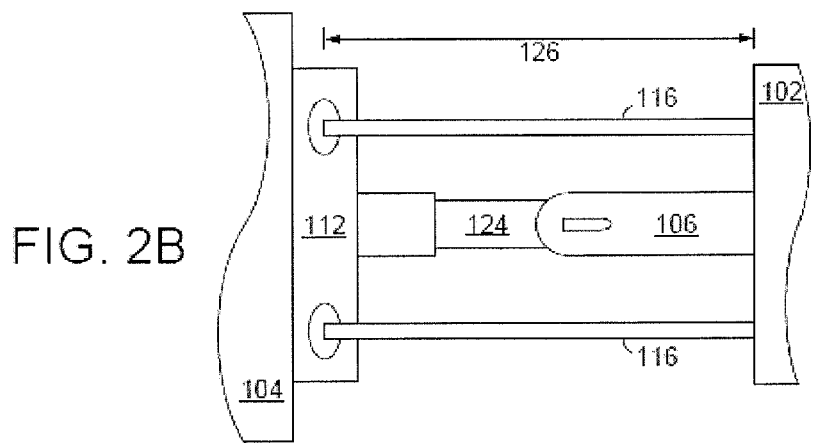

Turning to the respective side and top line representations of FIGS. 2A and 2B, a portion of an example bumper type towing hitch 120 is shown. The trailer coupler 106 is physically connected to the trailer ball 114 portion of the tow vehicle hitch 122. The trailer coupler 106 has a coupler latch 110 that can be engaged to continually apply pressure to the trailer ball 114 to effectively affix the trailer 102 to the tow vehicle 104.

While the trailer ball 114 may be an integrated part of a single tow vehicle receiver 112, various embodiments configure the receiver 112 to be adapted to connect to one of several different ball mounts 124. In other words, the receiver 112 may have an interconnection, such as a shaped recess, that mates with a portion of the ball mount 124 to create a unitary connection between the trailer coupler 106 and the tow vehicle 104. The ball mount 124 can be temporarily, or permanently, attached to the receiver 112 via one or more fasteners, such as a cotter pin, screw, or latch. The ball mount 124 may be configured to strategically position the trailer coupler 106 in relation to the tow vehicle 104, such as below the center of gravity or below the bumper of the tow vehicle 104.

FIG. 2B displays how the tow vehicle receiver 112 can have one or more features that allow the hitch retention feature 116 to selectively attach. In operation, the hitch retention feature 116 can be efficiently attached, and unattached, whenever the trailer 102 is being loaded or unloaded from the tow vehicle 104. The top view of FIG. 2B shows how hitch retention feature 116 extends a length 126 from the trailer 102 that corresponds with a maximum attached distance between the trailer 102 and tow vehicle 104. In other words, if the coupler 106 is disconnected from the receiver 112, the tow vehicle 104 could not be more than the hitch retention feature length 126 from the trailer 102 without disconnecting the hitch retention feature 116.

While the hitch retention feature 116 provides a level of safety and stability to towing the trailer 102, the secondary attachment capability of the hitch retention feature 116 can be used to facilitate movement of the trailer 102 without engaging the trailer coupler 106. For example, a thief can bypass a trailer lock that disables the trailer coupler 106 and instead enable movement of the trailer 102 by solely connecting at least one hitch retention feature 116 to a tow vehicle 104. Hence, a thief can quickly steal an entire trailer 102 despite the trailer 102 being protected by one or more locks that disable the function of the trailer coupler 106. Scenarios like these have emphasized a trailer lock system that goes beyond merely disabling the trailer coupler 106 by additionally preventing a hitch retention feature 116 from being connected to a tow vehicle 104.

It is noted that in a $5^{th}$ wheel type trailer connection that a hitch retention feature 116 may not be utilized. However, thieves can secure a pin box portion of a $5^{th}$ wheel hitch while a lock disables a king pin portion of the hitch. Through connection with the pin box portion of the hitch, thieves can effectively transport a trailer 102 to a location that allows them to enable use of the king pin portion of the hitch. Thus, some trailer lock system embodiments are directed to preventing a pin box portion of a 5$^{th}$ wheel hitch from being secured for transport by thieves.

Figure 3A:
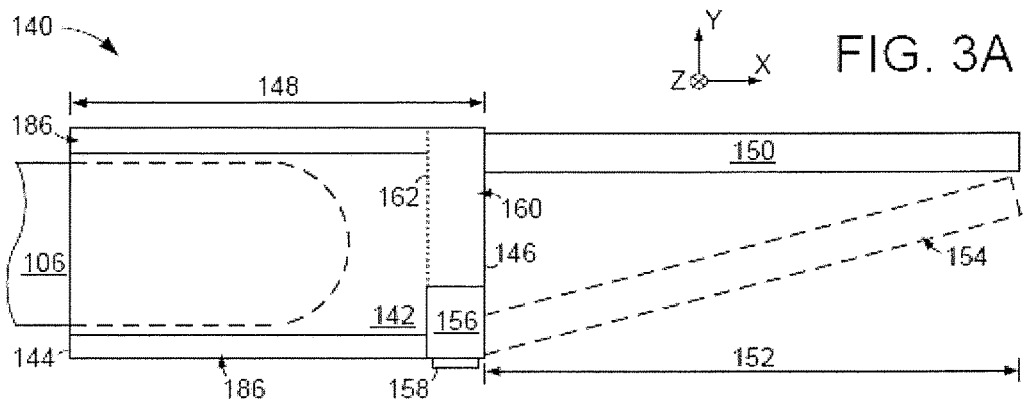

FIGS. 3A-3F respectively display assorted views of an example trailer lock system 140 that can be employed in accordance with some embodiments to enclose a trailer coupler 106 and immobilize a trailer 102. The top view line representation of FIG. 3A shows how the trailer lock system 140 has a first housing 142 that engages a second housing 144 to surround and enclose the trailer coupler 106.

It is noted that while the trailer lock system 140 does not seal the trailer coupler 106, the first 142 and second 144 housings collectively position housing material, such as ⅛" or greater thickness steel, aluminum, ceramic, plastic, or other rigid material, to continuously extend around the trailer coupler 106 in the Y-Z plane, which can be characterized as surrounding the coupler 106. The front plate 146 of the second housing 144 in combination with the first housing 142 serve to enclose the trailer coupler 106 with rigid material continuously extending around five sides (top, bottom, left, right, and front).

The collective first and second housings has a housing length 148 that can extend a predetermined distance along the trailer coupler 106, such as 4 inches or greater. One or more protrusions 150 can continuously extend from the first 142 and/or second 144 housings a protrusion length 152 that is selected to prevent a hitch retention feature 116, such as chains, from connecting a tow vehicle 104 to a trailer 102. That is, the protrusion length 152 is longer than a hitch retention feature 116, such as at least twice the housing length 148, to prevent the hitch retention feature 116 from interconnecting a trailer 102 and tow vehicle 104.

It is contemplated that the protrusion length 152 is less than the length of a hitch retention feature 116, but is long enough to cause damage to a would-be thief trying to transport a trailer 102 only by connecting the hitch retention feature 116 and without removing the first 142 and second 144 housings from the trailer coupler 106. In some embodiments, at least one protrusion 150 is shaped to deter connection of a hitch retention feature 116 to a tow vehicle, as generally illustrated by segmented protrusion 154. As a non-limiting example, a protrusion 150 may be partially, or completely, linear or curvilinear with any number of additional protrusions extending orthogonally or at non-normal angles with respect to the portion of the protrusion 150 connecting to the housings 142/144.

The second housing 144 can be configured with one or more locking regions 156 that are nested within the areal extent of the collective first 142 and second 144 housings to be occupied by at least one lock 158. That is, the locking region 156 wholly resides inside rectangular shape and exterior boundaries of the collective housings 142 and 144. As such, the locking region 156 does not protrude from the rectangular outer shape of the housings 142 and 144. However, other embodiments position the locking region 156 to protrude from the exterior boundary of the housings 142 and 144.

Any type of lock 158 may be utilized, such as a keyed, combination, fingerprint, and magnetic type locks. The locking region 156 may be arranged so that a unlocking portion, such as a key slot or combination selectors, are shielded from the exterior of the housings 142 and 144, which can make damaging and removing the lock 158 more difficult. For instance, the unlocking portion of the lock 158 may be oriented parallel to the Y-Z plane and shielded from access from the X-Z plane by one or more protective covers. It is contemplated that the locking region 156 may itself be locked or latched closed by a door.

Although placement of the locking region 156 is not limited to a particular location, the position of the region 156 may correspond with an open space 160, as defined by segmented line 162, between the first 142 and second 144 housings where rigid material is not present, which can allow debris and fluids to drain from between the housings 142 and 144. It is noted that the open space 160 is not required and some embodiments shape the first housing 142 to continuously contact the locking region 156 and front plate 146 along the Y axis.

Figure 3B:
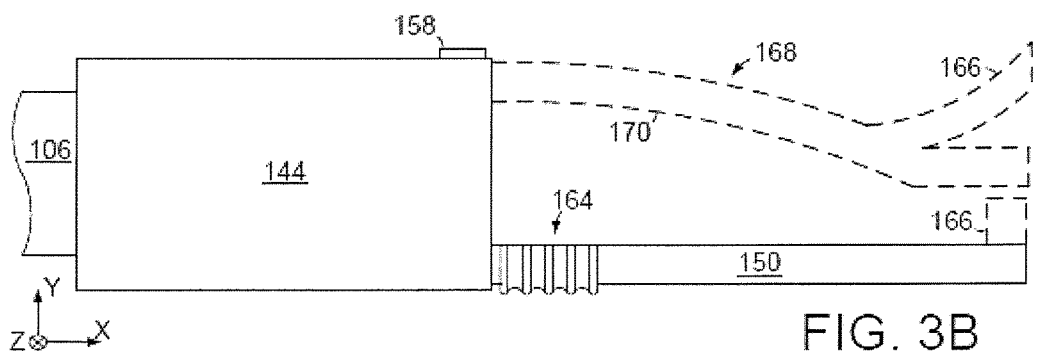

FIG. 3B is a bottom line representation view of the trailer lock system 140 that conveys how the second housing 144 can continuously extend to define the shape and exterior boundaries of the collective housings 142 and 144 without joints or connections. Such solid construction prevents thieves from easily breaking or cutting the second housing 144. As shown, the protrusion 150 is affixed to the second housing 144. The connection between the protrusion 150 and second housing 144 may be a weld, adhesive, or fastener, but various embodiments weld the protrusion 150 to provide maximum strength that deters tampering via cutting, such as with a plasma cutter or die grinder.

The protrusion 150 is configured with a handle feature 164 that can be shaped with one or more finger ridges to ease handling and articulation of the second housing 144 during installation and removal from a trailer coupler 106. The protrusion 150 may also have one or more secondary protrusions 166 that extend at perpendicular or non-normal angles, such as 45 degrees, from the X axis. Non-limiting segmented protrusion 168 illustrates how a protrusion can have linear and curvilinear portions along with a secondary protrusion 166 extending from the main protrusion portion 170 at an orthogonal orientation. It is contemplated that the protrusion 150 or housings 142 and 144 can have a hitch retention feature lock, such as an affixed padlock, that secures any hitch retention features 116 and makes articulation of the retention features more difficult, which increases the protection provided by the trailer lock system 140.

Figure 3C:
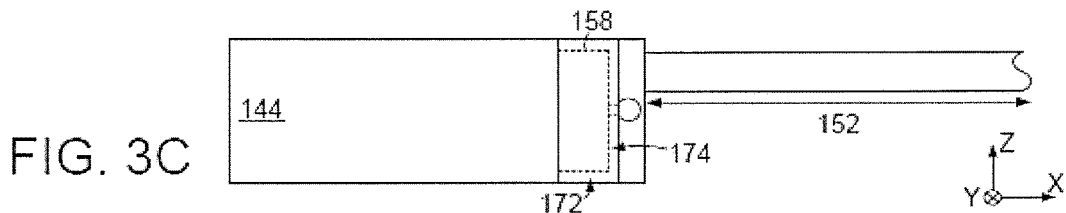

FIG. 3C is a side view line representation of the trailer lock system 140 that shows how the locking region 156 can orient the lock 158 to shield the body of the lock 158 from exposure to the outside of the collective first 142 and second 144 housings. For example, a lock plate 172 can be temporarily or permanently affixed to cover the lock 158. The lock plate 172, in various embodiments, can remain affixed while allowing access, but not exposure, to the unlocking portion 174 where a key is inserted. The ability to shield the body and unlocking portion 174 of the lock 158 from direct exposure to the outside of the housings 142 and 144 makes damaging the lock 158 more difficult than if the unlocking portion 174 was facing the outside of the housings 142 and 144.

Figure 3D:
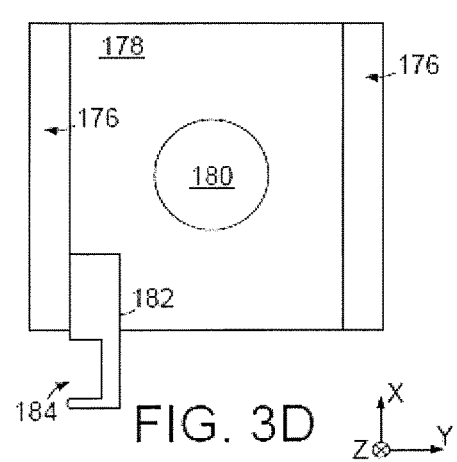

In FIG. 3D, a top view of the first housing 142 is displayed. The first housing 142 employs protruding cantilevers 176 the extend from opposite sides of a housing body 178 to allow sliding engagement with the second housing 144. A ball feature 180 also extends from the housing body 178 and is shaped to occupy the trailer ball region of the trailer coupler 106. It is noted that the ball feature 180 can be any size, shape, location, material, and connection to the housing body 178 to prevent the trailer lock system 140 from sliding off the trailer coupler 106 with force along the X axis. Hence, the ball feature 180 serves to prevent the first housing 142 from being physically removed from the trailer coupler 106 while the first 142 and second 144 housings are connected.

The first housing 142 has a connection feature 182 that can be retained by the lock 158 to secure the first 142 housing to the second housing 144. The connection feature 182 is shown as a plate configured with a notch 184 that allows selective engaging and disengaging with a locking mechanism of the lock 158. However, a notched plate is not required or limiting as a diverse variety of posts, hooks, magnets, and shaped rigid members can be employed to allow connection and locking of the first housing 142 to the second housing 144.

Figure 3E:
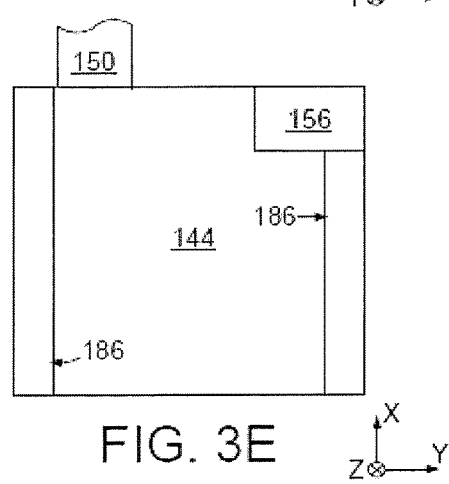

FIG. 3E is a bottom view line representation of the second housing 144 that illustrates retention cantilevers 186 that extend inward from opposite sides of the second housing 144 to allow engagement and retention of the first housing. While not limiting, the shape, size, and position of the cantilevers 176 and 186 allows a single person to install and remove the trailer lock system 140. For instance, a single person can hold the first housing 142 in position with the ball feature 180 occupying the ball region of the trailer coupler 106 and easily slide the second housing 144 to mate the respective cantilevers 176 and 186 and engage the connection feature 182 with the lock 156 to enclose the trailer coupler 106 and immobilize a trailer 102, as displayed in FIG. 3F.

Figure 4D:
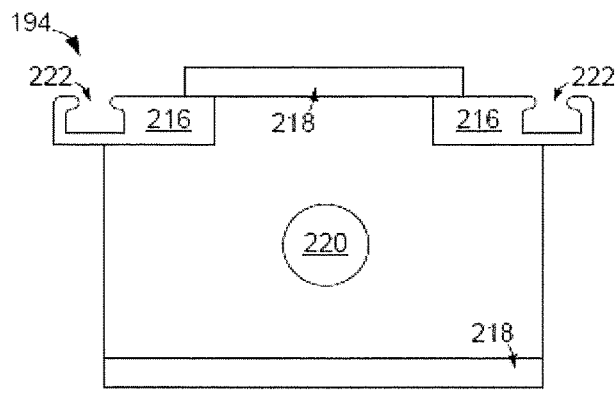

Turning to FIGS. 4A-4F, an end view line representation of the trailer lock system 190 is displayed as configured in accordance with assorted embodiments to prevent theft of a 5$^{th}$ wheel type trailer. FIG. 4A is a side view line representation of an assembled trailer lock system 190 where at least one protrusion 192 extends from a base housing 194 a distance 196, such as more than 18 inches, that prevents a king pin 198 portion of a pin box 200 from connecting the trailer 106 to a tow vehicle. First 202 and second 204 members engage and secure to the base housing 194 via respective locks 206 that occupy locking regions 208 of each member 202 and 204. In some embodiments, a coupling feature, such as a fastener, latch, lock, or magnet, connects the second housing 202 to the third housing 204 independently of the respective locks 206.

In operation, the first 202 and second 204 members slide into contact with the base housing 194 to provide a collective unit that encloses and surrounds the king pin 198 to prevent attachment of the king pin 198 to a receiver 112. Also, the collective base housing 194 and members 202 and 204 position the protrusion 192 to prevent securement of the trailer 106 while the king pin 198 is enclosed. It is contemplated that the king pin 198 may be a trailer ball and/or may extend from a tow vehicle, in which case the trailer lock system 190 would be inverted to enclose the trailer ball and the protrusion 192 would extend towards a trailer to prevent physical contact between the trailer 106 and trailer ball.

FIG. 4B is a top view of the trailer lock system 190 that shows how the first 202 and second 204 members are matching shapes and sizes that connect to the underlying base housing 194 to define a king pin trap region 210 that is tuned to fit snugly around the king pin 198, or a trailer ball attachment means. It is noted that the trap region 210 is symmetric along the joint between the first 202 and second 204 members, but such configuration is not required as the trap region 210 can have an asymmetric shape, as displayed by segmented region 212 to accommodate a diverse variety of king pin 198 sizes and shapes. It is noted that the trap region 210 can be tuned to physically contact a recess or notch in the king pin 198 to disable the operation of the pin box 200.

A bottom view line representation of the respective first 202 and second 204 members is provided in FIG. 4C. The bottom view illustrates how each member 202 and 204 has retention cantilevers 214 on opposite sides of the trap region 210 that allow each member 202 and 204 to slidingly engage the base housing 194. The respective retention cantilevers 214 can also align the respective locks 206 with connection features 216 of the base housing 194 to securely affix the members 202 and 204 about a king pin 198.

FIG. 4D conveys a top view line representation of the base housing 194 that presents the connection features 216 as well as base cantilevers 218 to engage and retain the member cantilevers 214. The base housing 194 can have one or more guide features 220 that are tuned for size, shape, and position to align the base housing 194 with the king pin 198 prior to, and while, the first 202 and second 204 members are attached to the base housing 194.

Figure 4E:
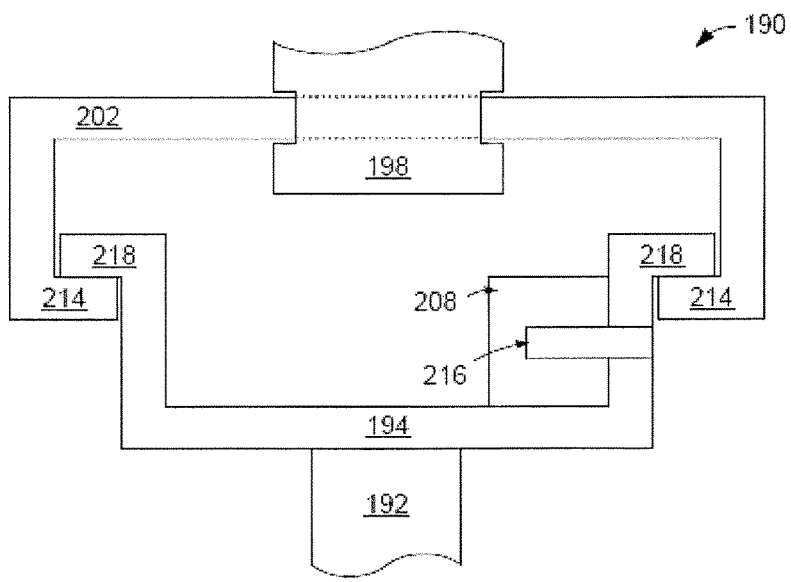

The cross-sectional profile of the assembled trailer lock system 190 shown in FIG. 4E conveys how the respective cantilevers 214 and 218 engage to reduce pressure placed on the respective locks 206. The sliding connection of the respective members 202 and 204 with the base housing 194 via the cantilevers 214 and 218 further add a level of protection for the trailer lock system 190 by preventing prying and cutting from disassembling the lock system 190.

Many aspects of the 5$^{th}$ wheel type trailer lock system 190 can be configured like the bumper type trailer lock system 140 of FIGS. 3A-3F. For instance, but in no way limiting, the protrusion 192 can be linear and/or curvilinear with any number of secondary protrusions. The respective member locks 206 can be nested within the areal extent of the shape and dimensions of the collective housing 194 and members 202 and 204. In contrast, the member locks 106 can expose an unlocking portion of the locks 206 to the exterior of the respective members 202 and 204. It is contemplated that the first member 202 is permanently affixed to the base housing 194 and only the second member 204 is installed to enclose and immobilize the king pin 198.

Figure 4F:
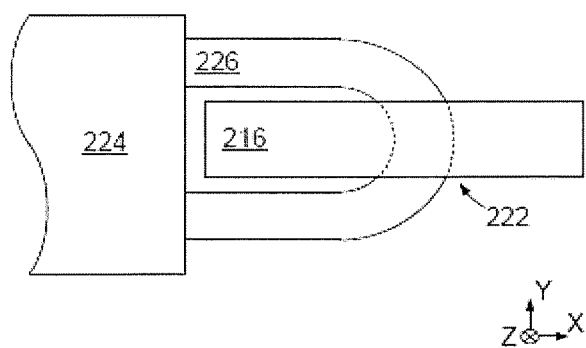

In the non-limiting embodiment illustrated in FIG. 4F, the notch 222 of the various connection features 182 and 216 are shaped to be locked by a padlock 224. That is, the notch 222 of each feature 182 and 216 is shaped and sized to allow a shackle/shank 226 portion of a padlock 224 to selectively engage and lock the features in place, which allows the respective locks 158 and 206 to be loose inside the locking regions 156/208 to facilitate padlock removal and replacement when warranted. Although the connection features 216 are shown as notched tabs, much like feature 182, any portion of a locking mechanism can be used to interconnect and secure the respective members 202 and 204 to the base housing 194.

A non-limiting example locking configuration is shown in FIG. 4D where the shackle/shank 226 portion of the lock 206 is affixed to the base housing 194 and the body portion of the padlock 224 is articulated by a user to engage the stationary shackle/shank 226 and occupy the notch 222 region of the connection feature 216. It is noted that while the padlock structure and locking operation of FIG. 4F is illustrated for a 5$^{th}$ wheel type trailer lock, a stationary shackle/shank 226 and articulating padlock body that fills the connection feature notch can also be utilized in the bumper type trailer lock 140 of FIGS. 3A-3F.

Figure 5:
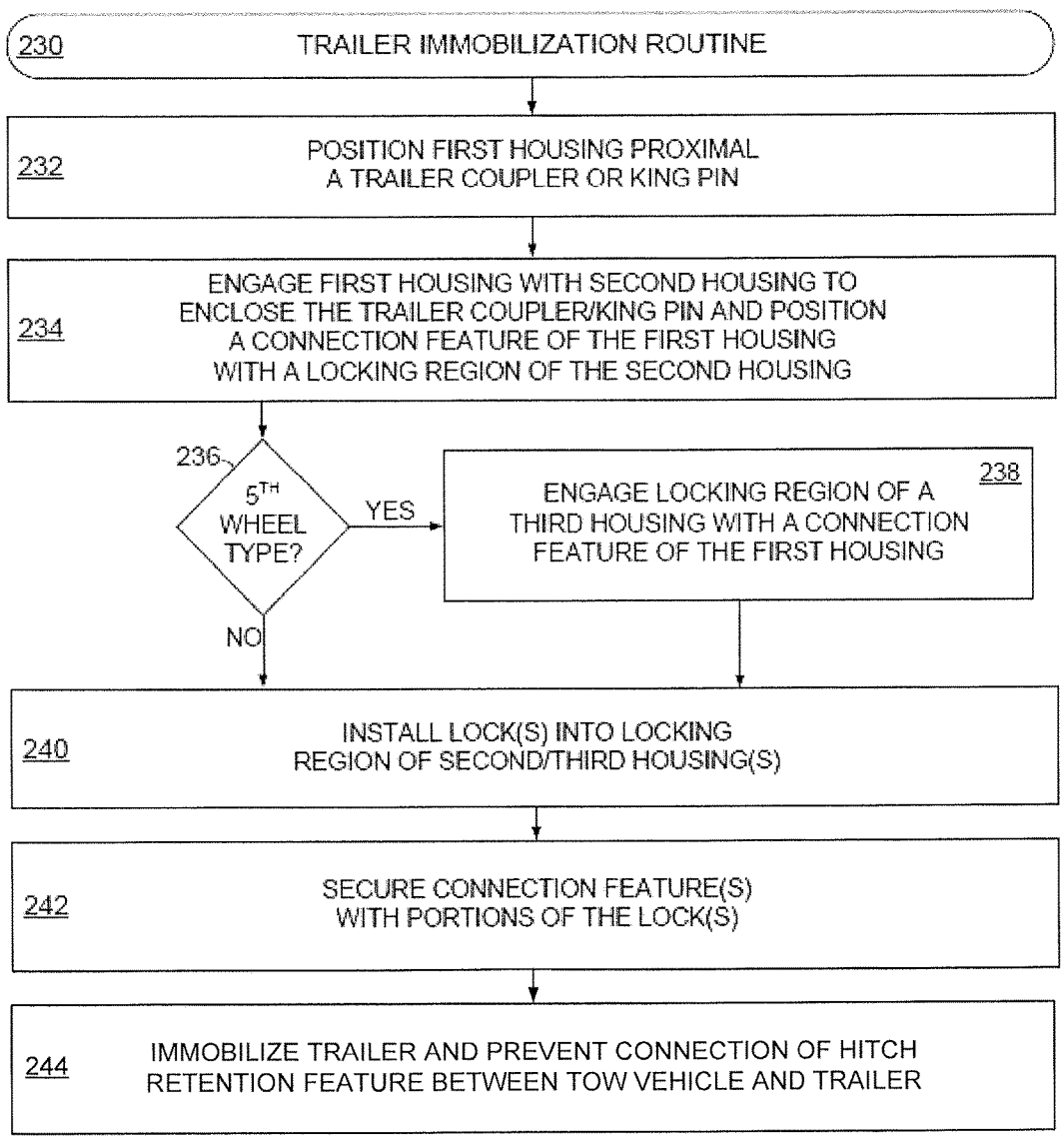
FIG. 5 provides an example trailer immobilization routine that can be carried out in accordance with assorted embodiments.

FIG. 5 is a flowchart of an example trailer immobilization routine 230 that can be carried out with various embodiments of a trailer lock system for either a bumper type trailer or a 5th wheel type trailer. The routine 230 begins with step 232 positioning a first housing, such as housing 142 or 194, proximal a trailer coupler or king pin portion of a trailer hitch. Step 232 can physically contact the hitch, like with a ball feature 180, or can be placed within an accessible distance, such as 1 foot or less, to allow a second housing to engage the first housing in step 234.

The engagement of the first and second housings in step 234 can be facilitated with sliding contact between cantilevered portions of each housing. The respective cantilevers may be configured to maintain the position of the housings to enclose the trailer coupler, in the case of a bumper type trailer, or a portion of a king pin, in the case of a 5th wheel type trailer. The assorted cantilevers may further align a connection feature of the first housing with a locking region of the second housing. Decision 236 next determines what type of trailer hitch is being immobilized.

If a 5th wheel type trailer is being locked, step 238 encloses a king pin by engaging a third housing, such as member 204, with the first housing so that a connection feature of the first housing is aligned with a locking region of the third housing. It is noted that the third housing may be configured to match, or have dissimilar size, shape, and features, than the second housing. For instance, the third housing can have cantilevered portions that interact with the first housing in a manner that matches, or is different, from the way the second housing interacts with the first housing.

When the connecting feature of the trailer (coupler or king pin) is enclosed either from step 234 or 238, step 240 proceeds to installs a locking mechanism into each locking region. It is noted that a locking mechanism may be permanently present in the locking region of the second and third housings, in which case step 240 would be skipped. The presence of the lock(s) allows step 242 to secure and lock the first housing to the second, and third, housing(s) by physically preventing movement of the connection feature from the locking region of each housing.

The activation of the lock(s) in step 242 consequently immobilizes the trailer in step 244 by surrounding the trailer attachment means (coupler/king pin) while preventing connection of any hitch retention features by positioning one or more protrusions between the trailer and the tow vehicle. It is contemplated that the hitch retention feature can be locked within, or onto, the collective housings to prevent use. As a result of the positioning of the protrusion(s) between the tow vehicle and trailer, the hitch retention feature is not long enough to connect to the tow vehicle and enable movement of the trailer while the coupler/king pin is enclosed and locked by the collective housings.

It is noted that the various aspects of the routine 230 are not required or limiting. As such, any portion of the immobilization routine 230 can be changed or removed and any number of steps and/or decisions can be incorporated. For example, an additional step may secure a hitch retention feature or articulate one or more protrusions, such as by rotating or physical extension, to ensure a hitch retention feature cannot connect to a tow vehicle.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a first housing configured to engage a second housing to define an areal extent that encloses a portion of a hitch, the second housing supporting a first protrusion attached to an external surface of the second housing and positioned the areal extent of the connected first and second housings, the first protrusion extending in a direction away from the hitch and second housing towards a vehicle with a length of at least six inches from the second housing.

2. The apparatus of claim 1, wherein a ball feature protrudes from the first housing and occupies a trailer ball region of the hitch.

3. The apparatus of claim 1, wherein the first and second housings collectively surround the enclosed portion of the hitch.

4. The apparatus of claim 1, wherein a lock is nested within the areal extent of the first and second housings.

5. The apparatus of claim 4, wherein the first housing has a connection feature extending into a locking region of the second housing to engage the lock and couple the first housing to the second housing.

6. The apparatus of claim 4, wherein the lock is separate and individually articulable from the first and second housings.

7. The apparatus of claim 4, wherein the lock is positioned in a locking region of the second housing, the locking region configured so that no portion of the lock is exposed to an exterior of the first and second housings.

8. The apparatus of claim 4, wherein the lock is affixed to the second housing.

9. The apparatus of claim 1, wherein the first and second housings each comprise at least ¼ inch thick metal with only welded joints.

10. The apparatus of claim 1, wherein the first protrusion extends a first length from the second housing that is at least double a second length of the second housing.

11. A method comprising:
  positioning a first housing proximal a trailer hitch; and
  engaging a second housing with the first housing to enclose and lock a portion of the trailer hitch, the first and second housings collectively having a housing length as measured parallel to the trailer hitch, the second housing comprising a protrusion continuously extending in a direction away from the hitch towards a vehicle with a protrusion length of at least twice the housing length.

12. The method of claim 11, wherein the protrusion length is longer than a hitch retention feature of the trailer hitch, the protrusion length preventing the hitch retention feature from connecting the trailer hitch to a vehicle.

13. An apparatus comprising:
  a first housing;
  a second housing configured to slidingly engage the first housing to enclose a portion of a trailer hitch, the first and second housings collectively having an areal extent defined by a housing length and a housing width; and
  a first protrusion attached to a front plate surface of the second housing external to the first and second housings, the first protrusion cantilevered from the second housing with a protrusion length that is greater than a hitch retention feature.

14. The apparatus of claim 13, wherein the hitch retention feature is separated from the trailer hitch, first housing, second housing, and first protrusion.

15. The apparatus of claim 13, wherein the first protrusion is wholly external to the areal extent of the first and second housings.

16. The apparatus of claim 13, wherein the hitch retention feature continuously extends from a trailer to a vehicle.

17. The apparatus of claim 13, further comprising a second protrusion continuously extending from the first protrusion and separated from the first housing and second housing.

18. The apparatus of claim 17, wherein the first protrusion is continuously linear and the second protrusion is continuously curvilinear.

19. The apparatus of claim 17, wherein the first protrusion is oriented at a non-normal angle with respect to the front plate surface.

20. The apparatus of claim 17, wherein the second protrusion is oriented orthogonally to the first protrusion.

* * * * *